United States Patent
Tang et al.

(10) Patent No.: US 10,823,965 B2
(45) Date of Patent: *Nov. 3, 2020

(54) PERIPHERAL TREATMENT FOR HEAD-MOUNTED DISPLAYS

(71) Applicant: Apple Inc., Cupertino, CA (US)

(72) Inventors: John G Tang, San Carlos, CA (US); Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,859

(22) Filed: Jul. 5, 2016

(65) Prior Publication Data

US 2020/0096766 A1 Mar. 26, 2020

Related U.S. Application Data

(63) Continuation of application No. 13/488,296, filed on Jun. 4, 2012, now Pat. No. 9,383,582, which is a continuation of application No. 11/580,774, filed on Oct. 13, 2006, now Pat. No. 8,212,859.

(51) Int. Cl.
*G02B 27/00* (2006.01)
*G02B 27/01* (2006.01)

(52) U.S. Cl.
CPC .. *G02B 27/0172* (2013.01); *G02B 2027/0112* (2013.01); *G02B 2027/0123* (2013.01); *G02B 2027/0161* (2013.01)

(58) Field of Classification Search
CPC . H04N 5/7491; H04N 13/0429; G02B 27/017
USPC .......................................................... 348/57
See application file for complete search history.

(56) References Cited

U.S. PATENT DOCUMENTS

| 6,185,045 B1 * | 2/2001 | Hanano | G02B 27/0172 359/630 |
| 2009/0167950 A1 * | 7/2009 | Chen | G06F 3/14 348/602 |

* cited by examiner

*Primary Examiner* — Jeffery A Williams
(74) *Attorney, Agent, or Firm* — Robert C. Kowert; Kowert, Hood, Munyon, Rankin & Goetzel, P.C.

(57) ABSTRACT

Methods and apparatus, including computer program products, implementing and using techniques for projecting a source image in a head-mounted display apparatus for a user. A first display projects an image viewable by a first eye of the user. A first peripheral light element is positioned to emit light of one or more colors in close proximity to the periphery of the first display. A receives data representing a source image, processes the data representing the source image to generate a first image for the first display and to generate a first set of peripheral conditioning signals for the first peripheral light element, directs the first image to the first display, and directs the first set of peripheral conditioning signals to the first peripheral light element, As a result, an enhanced viewing experience is created for the user.

20 Claims, 7 Drawing Sheets

PERIPHERAL TREATMENT FOR HEAD-MOUNTED DISPLAYS

CROSS-REFERENCE TO RELATED APPLICATIONS

This application is a continuation of and claims the benefit of priority to U.S. patent application Ser. No. 13/488,296, filed on Jun. 4, 2012, which is a continuation of and claims the benefit of priority to U.S. patent application Ser. No. 11/580,774, filed on Oct. 13, 2006, now issued as U.S. Pat. No. 8,212,859, the benefit of priority of each of which is claimed hereby, and each of which are incorporated herein by reference in its entirety.

BACKGROUND

This invention relates to displaying images in a head-mounted display. A head-mounted display (HMD) is a display device that a person wears on the head in order to have video information directly displayed in front of the eyes. HMDs are also known as near-to-eye displays. A HMD has either one or two small CRT, LCD or OLED displays with magnifying lenses and other associated optical elements. The display(s) and optics are typically embedded in a helmet, glasses, or a visor, which a user can wear. Lenses and other optical components are used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth to the images by simulating the angular difference between the images viewed by each eye when looking at an object, due to the different positions of the eyes. This angular difference is one of the key parameters the human brain uses in processing images to create depth perception or distance in human vision.

Some HMDs can be used to view a see-through image imposed upon a real world view, thereby creating what is typically referred to as an augmented reality. This is accomplished by reflecting the video images through partially reflective mirrors, such that the real world is seen through the mirrors' reflective surfaces. The augmented reality can be combined with the stereoscopic images in various types of applications. Some examples include applications in surgery, where radiographic data, such as CAT scans or MRI imaging can be combined with the surgeon's vision. Military, police and firefighters use HMDs to display relevant tactical information, such as maps or thermal imaging data. Engineers and scientists use HMDs to provide stereoscopic views of CAD schematics, simulations or remote sensing applications. Consumer devices are also available for use in gaming and entertainment applications.

Figure 1A:
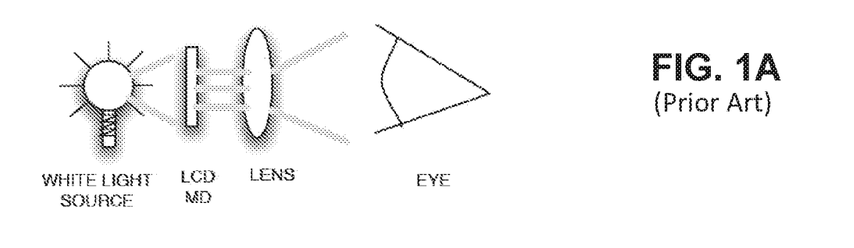
FIGS. 1A-1D schematically show some exemplary display configurations in HMDs.

FIGS. 1A-1D show some exemplary schematic views of different HMD display architectures. FIG. 1A shows an example of a transmissive HMD display architecture. In this architecture, a white light source, such as a white LED illuminates a liquid crystal display (LCD) that displays an image to a user. The image is then relayed to the user's eyes through an optical system, which can be either an aspherical or diffractive lens system. Such lens systems are well known to those of ordinary skill in the art and will also be discussed in further detail below.

Figure 1B:
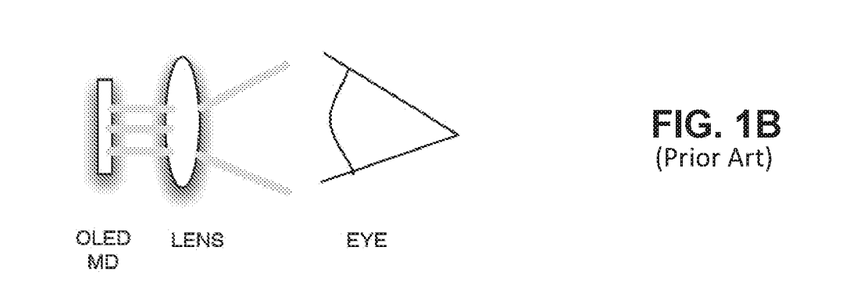

FIG. 1B shows an example of an emissive HMD display architecture. In this architecture, the display is an Organic Light Emitting Diode (OLED) display, and thus a separate light source can be avoided. The image is then relayed to the user's eyes through an optical system, similar to the system described above with respect to FIG. 1A.

Figure 1C:
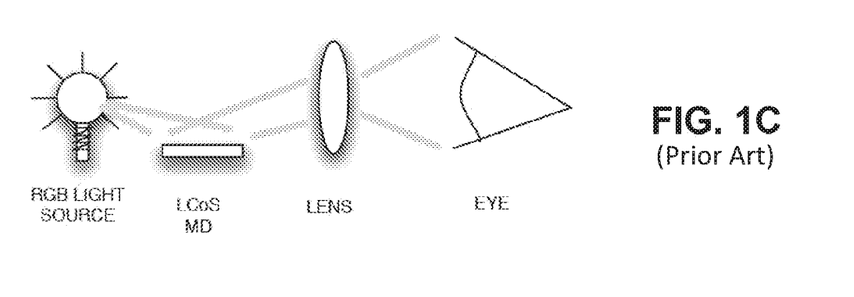

FIG. 1C shows an example of a reflective HMD display architecture. In this architecture, the display is a Liquid Crystal on Silicon (LCoS) display. In LCoS, liquid crystals are applied to a reflective mirror substrate, A light source, such as a white or RGB LED directs light onto the LCoS display. As the liquid crystals in the display open and close, the light is either reflected from the mirror below, or blocked. This modulates the light and creates the image. The image is then relayed to the user's eyes through an optical system, similar to the system described above with respect to FIG. 1A.

Figure 1D:
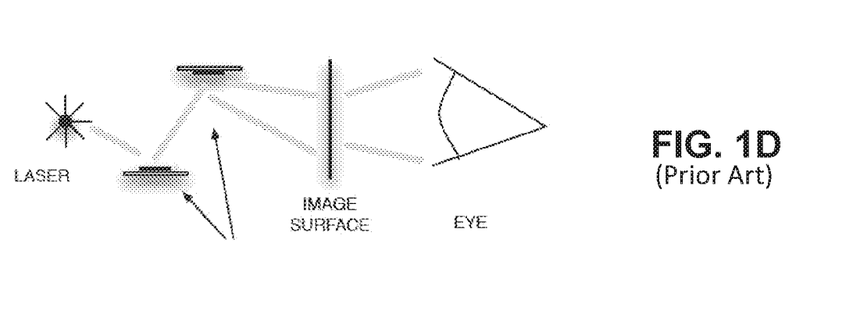

FIG. 1D shows an example of a Micro-electro-mechanical (MEM)/Laser display architecture for a HMD. MEM devices are devices that are capable of constructively and destructively interfering with an incident light source to produce one or more optical signals. Optical MEM devices are typically fabricated from Silicon-based materials using lithographic techniques. Optical MEM devices have reflective ribbons that are formed over a suitable substrate structure, such that the ribbons are spatially arranged in parallel and are coupled to the substrate structure. In use, portions of the reflective ribbons are moved by applying an operating bias voltage, or switching voltage, across the ribbons and the substrate structure. By alternating, or switching, the potential of the bias voltage, the ribbons are alternated between the positions for constructive and destructive interference with the incident light source to generate optical signals. As can be seen in FIG. 1D, the light source is a laser, and the resulting optical signals from the MEM devices are displayed on an image surface and viewed by the user.

A problem with HMDs, primarily HMDs that are not of the see-through kind, is that the image on the display in front of each eye fills the central but not the peripheral field of view of the user. Consequently, the visual experience is similar to looking into a box or tunnel having a small screen at a distance. Peripheral vision is good at detecting motion and as a result, occluded peripheral vision in HMDs can cause a user to experience motion sickness symptoms after some time. Thus, whereas existing HMDs may work well for their intended purposes for short periods of time, there is a continuing need for improved HMDs that provide enhanced long-time visual experience for the user.

SUMMARY

The present invention provides methods and apparatus for treating the peripheral area of a user's field of view in a head mounted display, and thereby creating improved comfort and usability for head mounted displays. The peripheral area adjacent to the displayed image is treated, such that the peripheral area is coordinated with the image on the display. The coordination can be in the form of color projections, achieved, for example, by light emitting diodes (LEDs) or other displays, such that the colors surrounding the display dynamically matches what is shown on the display. As a result, the peripheral area "converges" with the display area, which reduces the "tunnel effect" or "box effect" experienced by the user. Various embodiments of the invention allow users to customize different viewing parameters of the head mounted displays to accommodate for variation in the individual users' eyes.

In general, in one aspect, the invention provides methods and apparatus, including computer program products, implementing and using techniques for projecting a source image in a head-mounted display apparatus for a user. A first display projects an image viewable by a first eye of the user. A first peripheral light element is positioned to emit light of one or more colors in close proximity to the periphery of the first display. A processor receives data representing a source image, processes the data representing the source image to generate a first image for the first display and to generate a first set of peripheral conditioning signals for the first peripheral light element, directs the first image to the first display, and directs the first set of peripheral conditioning signals to the first peripheral light element. As a result, an enhanced viewing experience is created for the user.

Advantageous implementations can include one or more of the following features. The processor can receive data representing the source image from an external source. The external source can be a portable source and can include a memory in which the source image is stored. A memory operatively coupled to the processor can be provided in which the data representing the source image is stored. The first display can have an aspect ratio of 16:9. The data representing the source image and the first image can be image frames of a movie. The first set of peripheral conditioning signals can include instructions for which one or more colors to display with the first peripheral light element. The first set of peripheral conditioning signals can include instructions for how long to display the one or more colors.

The first image can include one or more colors, and the first set of peripheral conditioning signals can include instructions to display colors corresponding to at least some of the colors in the first image. The processor can divide the first image into a plurality of regions, determine a dominating color for each region, and include the dominating colors in the first set of peripheral conditioning signals. The peripheral light elements can be light emitting diodes, electro luminescent displays or organic light emitting diodes. The peripheral light elements can be located at a distance from the first display and the light from the peripheral light elements can be conveyed to the periphery of the display by optical fibers or light pipes.

A user interface including one or more controls can be provided for providing instructions from the user to the processor about how to generate the first set of peripheral conditioning signals. A diffuser can be located in the light path between the first peripheral light element and the first eye of the user, in order to soften the light emitted by the first peripheral light element before the light reaches the first eye of the user.

A second display can be provided for projecting an image viewable by a second eye of the user, and a second peripheral light element can be positioned to emit light of one or more colors in close proximity to the periphery of the second display. The processor can then process the data representing the source image to generate a second image for the second display and to generate a second set of peripheral conditioning signals for the second peripheral light element; direct the second image to the second display; and direct the second set of peripheral conditioning signals to the second peripheral light element. The first and second images can be horizontally translated relative to each other. The first and second images can be the same. The first and second set of peripheral conditioning signals can be the same.

The various embodiments of the invention can be implemented to include one or more of the following advantages. One advantage is that the treatment of the peripheral area of the field of view leads to increased viewing comfort compared to conventional HMDs and may also lead to a smaller likelihood of the user experiencing "motion sickness" phenomena during extended viewing. Another advantage is that users can make individual adjustments of their HMDs to fit the distance between their eyes. Further advantages include a greater immersive experience, larger virtual field of view, and increased overall image brightness.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

Like reference symbols in the various drawings indicate like elements.

DETAILED DESCRIPTION

The invention will be described in detail with reference to specific implementations including the best modes contemplated by the inventors for carrying out the invention. Examples of these specific implementations are illustrated in the accompanying drawings. While the invention is described in conjunction with these specific implementations, it will be understood that this description is not intended to limit the invention to the described implementations. On the contrary, the description is intended to cover alternatives, modifications, and equivalents as may be included within the spirit and scope of the invention. In the following description, specific details are set forth in order to provide a thorough understanding of the present invention. The present invention can be practiced without some or all of these specific details. In addition, well-known features or details may not have been described to avoid unnecessarily obscuring the invention. In order to fully appreciate the properties of the various embodiments of the invention, some concepts relating to the human vision and image science research will be explained.

Field of view (FOV): The field of view for an image describes the angular extent of the image, that is, the amount of a given scene that is viewable in the image. The human eye has a 180-degree field of view, and typically the images projected on displays in HMDs only show a much smaller field of view. This is largely due to the limitations of the lenses that are used to record the image. Various embodiments of the present invention, as will be described below, provide mechanisms for maximizing the FOV for the images, to make it as close the FOV of the human eye as possible.

Peripheral vision: Peripheral vision is a part of vision outside the very center of gaze. There is in actuality a very broad set of non-central points in the field of view that is included in the notion of peripheral vision. "Far peripheral" vision exists at the edges of the field of view, "mid-perpheral" vision exists in the middle of the field of view, and "near-peripheral", sometimes referred to as "paracentral" vision, exists adjacent to the center of gaze. Peripheral vision is good at detecting motion and as a result, occluded peripheral vision in HMDs can cause a user to experience motion sickness symptoms.

Eye motion box (EMB): The eye motion box represents the area in which the user's eye can move without loss of the full FOV. Having a sufficiently large EMB is one of the most significant parameters relating to the viewing comfort of the user. A typical EMB is about a 10-15 millimeter square.

Image focal plane: The plane is where an image is focused. Typically, having an image focal plane located far away is more comfortable, since it minimizes the strain on the accommodation muscles in the eyes. Strain on these muscles is thought to be related to myopia, that is, near-sighted vision.

Eye relief: The eye relief is the offset of the nearest optical surface from the eye. The optimal eye relief distance, is typically considered to be the distance at which the exit pupil is approximately the same size as the eye's pupil. The optimal eye relief distance is usually in the range of about 18-30 mm. Using an exit pupil smaller than the observer's pupil may force the user to press his or her eye close to the eyepiece in order to see an unvignetted image. Alternatively, using an exit pupil larger than the observer's pupil at a comfortable viewing position, results in wastage of light and a dimmer than optimum image.

A particularly useful application for the HMDs in accordance with various embodiments of the invention lies within the entertainment field, namely viewing movies.

Figure 2:
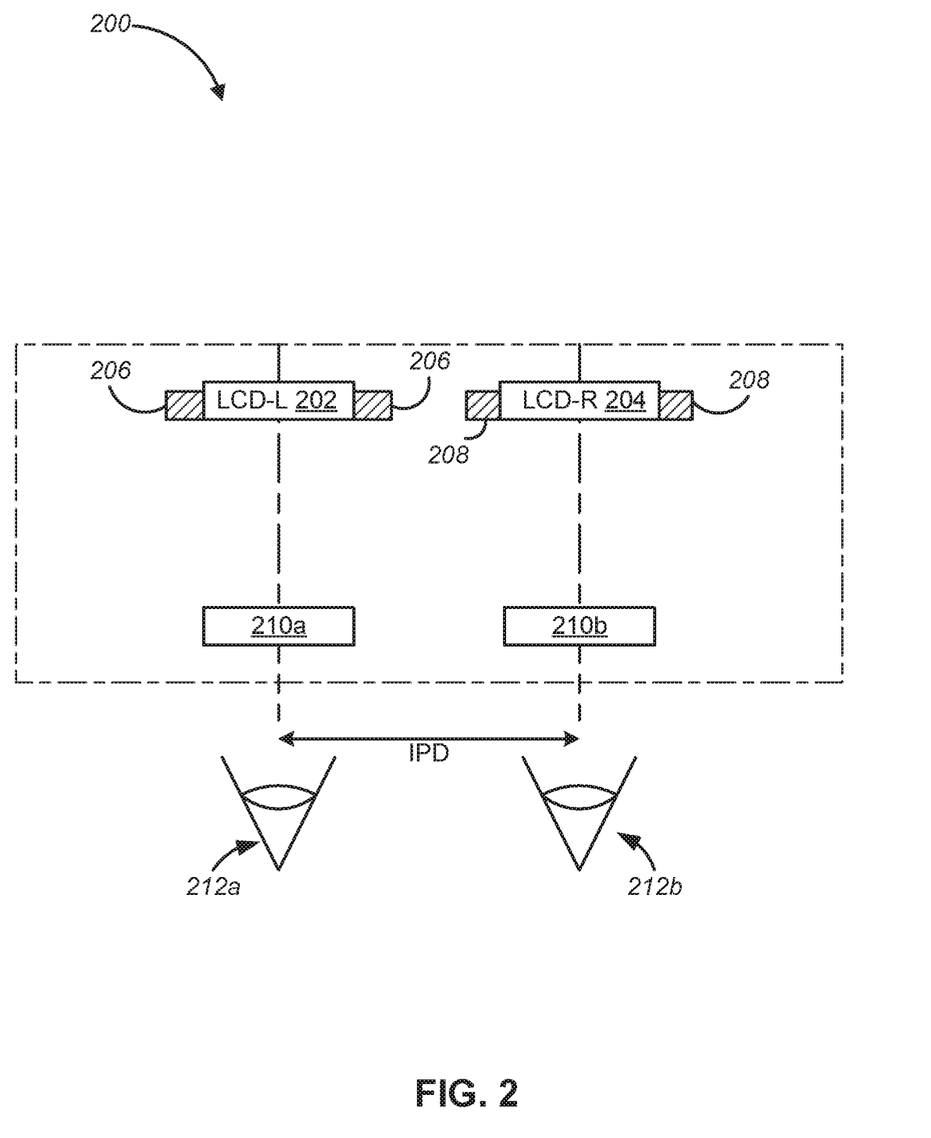
FIG. 2 shows a schematic view of the placement of the displays and associated peripheral light elements relative to the user's eyes in a HMD with two displays in accordance with one embodiment of the invention.

FIG. 2 shows a schematic top view of a HMD (200) in accordance with one embodiment of the invention. As can be seen, the HMD (200) has two displays (202; 204) that are situated in front of the user's eyes (212*a*; 212*b*). Optical components (210*a*; 210*b*) focus the images from the respective displays (202; 204) onto the user's eyes (212*a*; 212*b*) at a comfortable viewing distance. The periphery of each of the displays (202; 204) is surrounded by one or more peripheral light elements (206; 208).

The peripheral light elements (206; 208) illuminate the peripheral area around the displays (202; 204) in such a way that the peripheral area is color coordinated with a current image that is displayed on the display. That is, as the images change on the displays, for example, when a movie is displayed, the peripheral colors also change dynamically to match the colors in the image. How this color coordination is done will now be described with reference to FIG. 3, which shows a schematic view of an image generation system (300) in the HMD, and to FIG. 4, which shows a flowchart for the processing and display of an incoming video signal.

Figure 3:
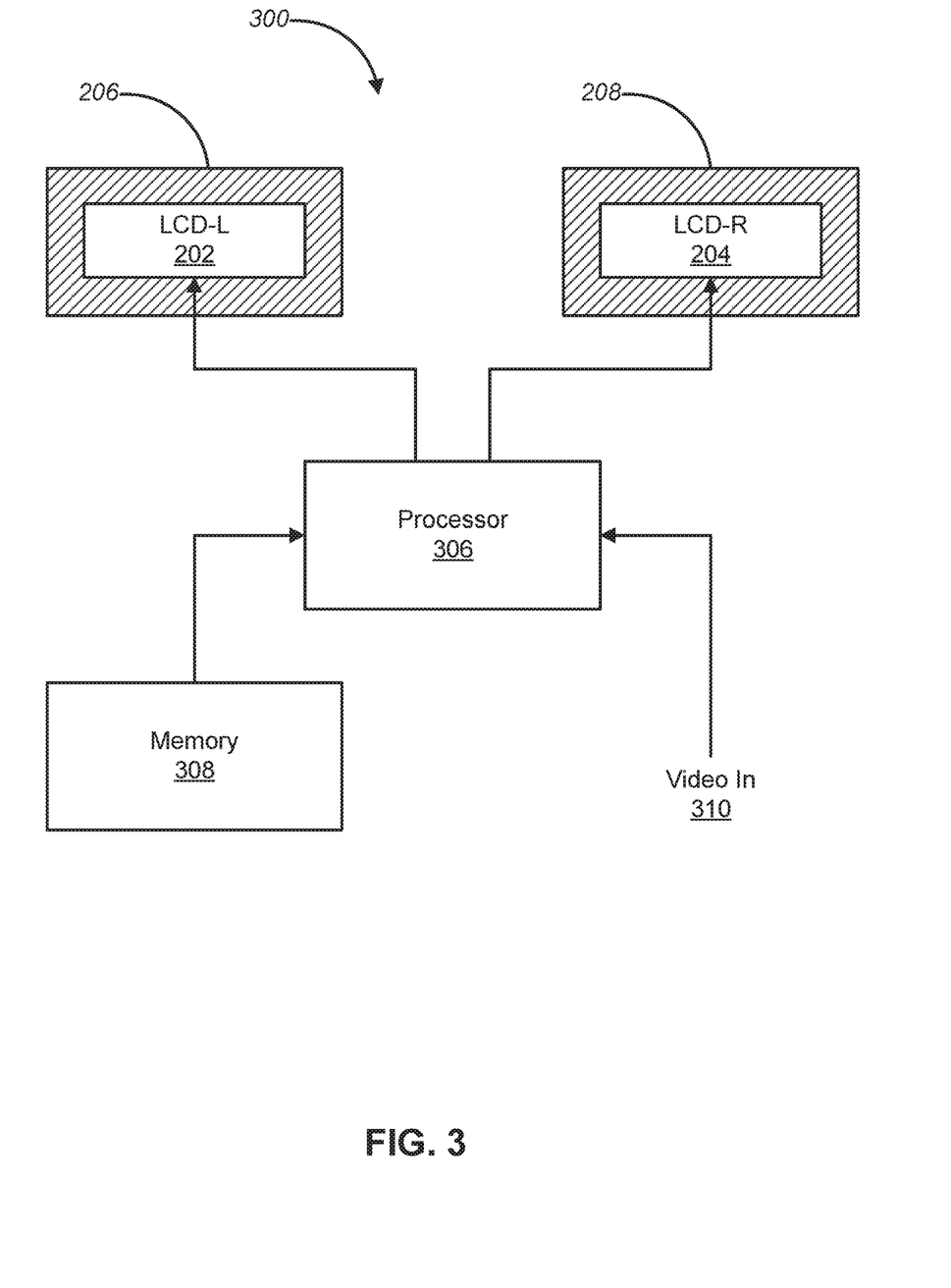
FIG. 3 shows a schematic view of a HMD image generation system in accordance with one embodiment of the invention.

As can be seen in FIG. 3, the system image generation system (300) includes the left display (202) and the right display (204), a processor (306), and a memory (308). Each of the displays (202; 204) is surrounded by one or more peripheral light elements (206; 208), which are capable of displaying light of different colors in response to instructions received from the processor (306). The processor (306) is connected to the memory (308), which contains instructions for how to process image frames contained in an incoming video signal (310), which represents a movie to be displayed in the HMD, and instructions for how to generate color data to be displayed on the peripheral light elements (206; 208) based on the processing.

In some embodiments, the peripheral light elements (206; 208) are two larger displays that are located around the HMI) displays (202; 204), as shown in FIG. 3. Each of these larger displays (206; 208) "expands" the periphery of the regular displays (202; 204), for example, by displaying a larger version of the picture, or by displaying similar colors to what is displayed on the regular displays (202; 204). It should be noted that the larger displays (206; 208) do not need to show images that are in focus, as the peripheral vision is primarily used for detecting color and movement. In fact, studies show that the human eye typically only views about 12% of the displays, located around the central portion of the displays. In sonic cases, it may be possible to go beyond utilizing color coordinated with the image. One example is to use display images on the periphery to enhance the central display image.

In some embodiments, the peripheral light elements (206; 208) are light emitting diodes (LEDs). The LEDs can be distributed around the displays (202; 204) and can either have discrete colors or so called RGB (Red Green Blue) LEDs, which have the capability of displaying many different colors. In order to soften the light from the LEDs, they may be placed behind some kind of translucent material, such as glass or plastic that diffuses the light before it reaches the eyes of the user. The LED colors can transition in color and intensity in a variety of manners to produced a desired effect. For example, switch quickly from red to blue or fade from red to blue.

Some embodiments have peripheral light elements that are electro luminescent displays (ELDs). ELDs are well known to those of ordinary skill in the art, and can be generally described as "lossy capacitors" in the sense that they become electrically charged and then lose their energy in the form of light. An ELD works by sandwiching a thin film of phosphorescent substance between two plates. One plate is coated with vertical wires and the other with horizontal wires, forming a grid. When an electrical current is passed through a horizontal and vertical wire, the phosphorescent film at the intersection glows, creating a point of light, or pixel. Typically this embodiment has limited color and resolution, but the elements are flexible and thin providing other possible configurations. For example, the light element does not have to be in the same plane as the central display element. It also can be non planar as ELD can operate when bent.

Some further embodiments have peripheral light elements that are formed by a bundle of optical fibers, in which nicks or other types of marks have been made in the mantel that coats the individual fibers. As a result, a portion of the light inside the fiber escapes out through the side of the fiber rather than being reflected back into the fiber by the mantel. With multiple fibers and a small portion of light leaving the fibers at irregular distances, this provides an efficient way of diffusing the light. In these embodiments, the light sources (for example, LEDs) can be located at a distance from the displays (202; 204), since the light travels through the fibers. The fibers are also typically fairly flexible and can be wrapped around the periphery of the displays (202; 204).

Also by varying the length of the fibers, different sizes of displays can be accommodated without any need of changing the number of light sources.

An alternative way of locating the light sources away from the periphery of the displays (202; 204) is to use light pipes. The light pipes have one end located at the light source and the other end located close to the periphery of the display. One common category of light pipes are prism light guides, which come in several different geometrical configurations, but typically have a cylindrical transparent structure with circular cross-section. The light travels mainly in a hollow air space inside the guide and undergoes total internal reflection whenever it strikes the prismatic surface, provided the angle the light ray makes with the axial direction is less than the prism light guide acceptance angle. One advantage of the prism light guide is its low level of absorption. In any hollow guide, light rays spend most of their time in the enclosed air space where losses are negligible. Although there are fundamental losses associated with diffraction of light when it encounters the prismatic microstructures, these losses are very small. In a practical prism light guide, the main loss is due to bulk absorption and scatter in the material from which the microstructures are made and surface roughness and optical imperfections of the prismatic structures. Typically these amount to less that 2% per wall reflection. Consequently, for the short distances that prevail in HMDs, these losses are negligible. One feature of light pipes is the ability to direct light. It would be possible to light pipe(s) in front of the display element, beside the eyes directing the coordinated color to the sides of the display element. This would be similar to aiming a flashlight toward the screen, but with the ability to change colors and intensity.

Figure 4:
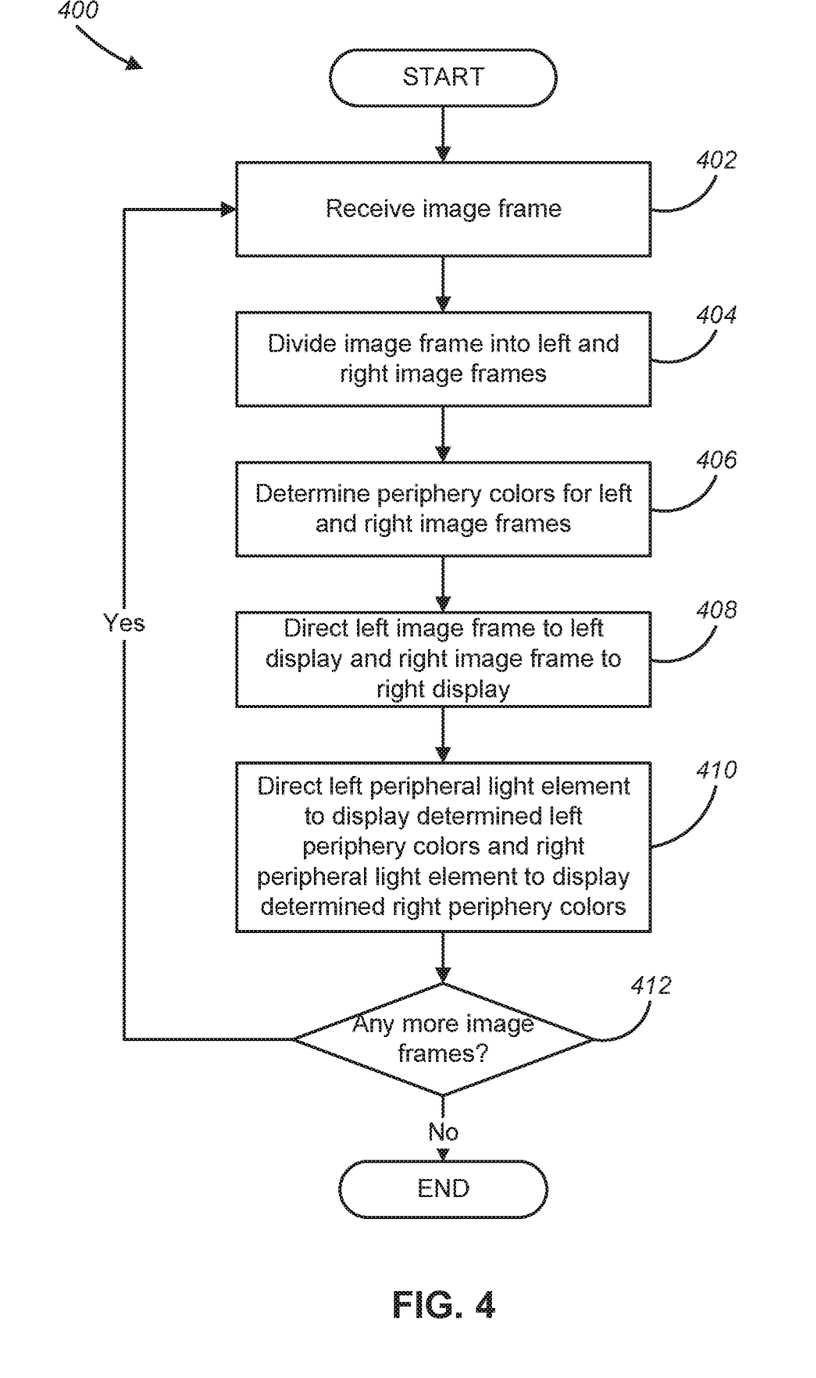
FIG. 4 shows a flowchart of a process for treating the peripheral area around two HMD displays in accordance with one embodiment of the invention.

FIG. 4 shows a process for performing peripheral treatment of an image by directing the peripheral light elements (206; 208) to display light that matches what is currently displayed on the respective displays (202; 204) in the HMD. As can be seen in FIG. 4, the process (400) starts by the processor (306) receiving an image frame of the movie (step 402), shown as "Video In" (310) in FIG. 3. The image frame can be received from an external video source, such as a portable video player connected to the HMD, or even through a wireless connection to some external video source. Alternatively, the memory (308) in the HMD can contain one or more previously downloaded videos that can be accessed by the processor (306) in the same way that a video from an external source is accessed.

The processor (306) then divides the received image frame into a left image to be displayed on the left display (202) and a right image to be displayed on the right display (204) (step 404). In one embodiment this is done, for example, by duplicating the incoming image frame into two image frames—one for the left display (202) and one for the right display (204). In other embodiments, the processor can perform additional operations when dividing the incoming image frame, for example, translating the images by some fraction in the horizontal plane, such that the left display (202) and the right display (204) will show slightly different images.

Next, the processor (306) determines periphery colors for each of the right and left images (step 406). In doing this, the processor (306) uses software instructions that are stored in the memory (308). As the skilled user realizes, there are many possible ways of making this determination. For example, in some embodiments, the processor (306) may divide each image frame into a central section and right, left, top, and bottom periphery sections; determine a predominating color in each of the periphery sections; and assign this predominating color as the periphery color. In other embodiments, a single predominating color for the entire image frame can be determined and assigned as the periphery color. In yet other embodiments one predominating color can be determined for the top half of the image frame and another predominating color for the bottom half of the image frame, for example, blue and yellow for an image frame showing a landscape picture with a blue sky above a wheat field. In various embodiments of the invention, the user may also be provided with a menu that allows the user to select which type of mode the processor should use in determining the periphery colors. The processor could also measure the average color gamut of the images and with that decides on the periphery color. It could also measure dominant color of the image to determine a coordinated peripheral color; i.e., sky, ocean, forest. In other embodiments, the processor (306) may even determine the colors of pixels or pixel groups about the periphery of the left and right images; and assign the colors to associated pixels or pixel groups of the peripheral light elements (e.g., the light elements may be pixilated).

After determining the periphery colors, the processor (306) directs the left image frame to the left display (202) and the right image frame to the right display (204) in the HMD (step 408). The processor then directs the left peripheral light element to display the determined left periphery colors and the right peripheral light element to display the right periphery colors (step 410). The process then determines whether there are any more image frames to be displayed (step 412). If there are additional image frames, the process returns to step 402, and if there are no more image frames, then the process ends.

As was discussed above, there are a wide variety of display architectures that can be used in HMDs. The principles discussed above with respect to FIGS. 3 and 4 can be applied to any of these architectures. Each of these architectures comes with its particular advantages and drawbacks. For example, the LCD microdisplays shown in FIG. 1A have high brightness, good color saturation, good image sharpness and have a relatively low manufacturing cost, but they also exhibit screen door effects and have some inherent size limitations (e.g., size, pixel density, ability to scale for high volume). Screen door effects generally occur if the resolution of the LCD display is not high enough (dense enough), thus enabling the user to see the individual pixels. Because the pixels are arranged in rectilinear formation, it is like looking through a screen door (the space between each pixel become the wires in the screen door).

The OLED microdisplays shown in FIG. 1B exhibit low power consumption, require simple optics, have high contrast ratio, and have a low manufacturing cost, but they have limited lifetime and their brightness decreases over time. They may also have potential problems with resolution and pixel consistency.

The LCoS micmdisplays shown in FIG. 1C have a high pixel density and contrast, fast response time, IC compatibility and are experiencing an increasing application in RPTV (Rear Projection TV). On the other hand, there are currently some concerns about their lifetime, they suffer from color break ups that create rainbow effects, and further they require more complex optics and the color saturation is poor. Rainbow effects are typically a problem with LCoS based display systems because they need to use "field sequential color lighting". Pixels in the LCoS turn on and off and thus reflect or not. In order to produce an image, red, green and blue colors are sequentially flashed onto the LCoS panel (field). The LCoS is coordinated with this and creates the image by having the appropriate pixels turn on or off. The three color sequence happens so fast that your eyes do not see the individual colors. But you can create instances where these colors sequences show up by waving your hand in front of the display or moving your eyes across the image quickly. It shows up like a rainbow.

The MEMs laser systems shown in FIG. 1D have infinite focus, the widest color gamut, and small size. On the other hand, there are currently some concerns about safety and power consumption. Furthermore, they require fast modulating lasers.

The displays can have different aspect ratios depending on the primary application of the HMD. For example, an aspect ratio of 4×3, i.e., similar to a television screen, may be desirable by a user who primarily is interested in using the HMDs to watch television programs, whereas an aspect ratio of 16×9, i.e., similar to a movie theatre screen, may be desirable by a user who primarily is interested in watching feature films.

The above discussion has been focused on the image generation system and the displays of the HMD. Another important component of the HMD is the optics (210a; 210b), which actually transforms the image on the displays into an image that can be viewed by the human eye. A brief overview of various optical arrangements that can be used in accordance with various embodiments of the invention will now be described.

Figure 5A:
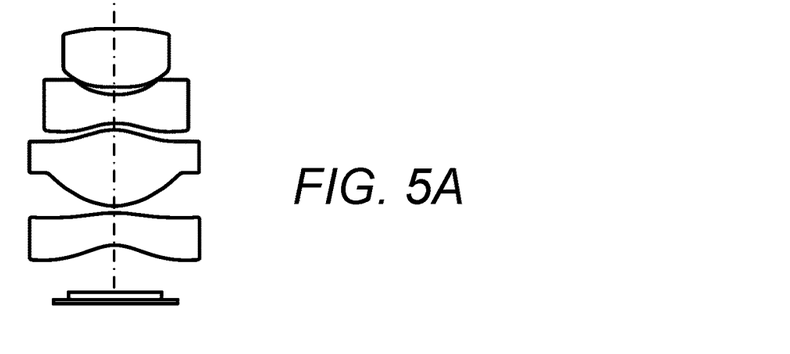
FIGS. 5A-5C show some schematic views of aspherical optical arrangements for use in a HMD in accordance with several embodiments of the invention.
Figure 5B:
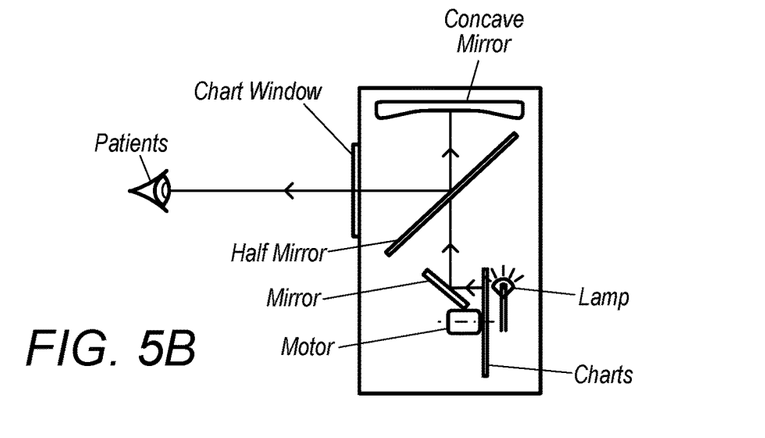
Figure 5C:
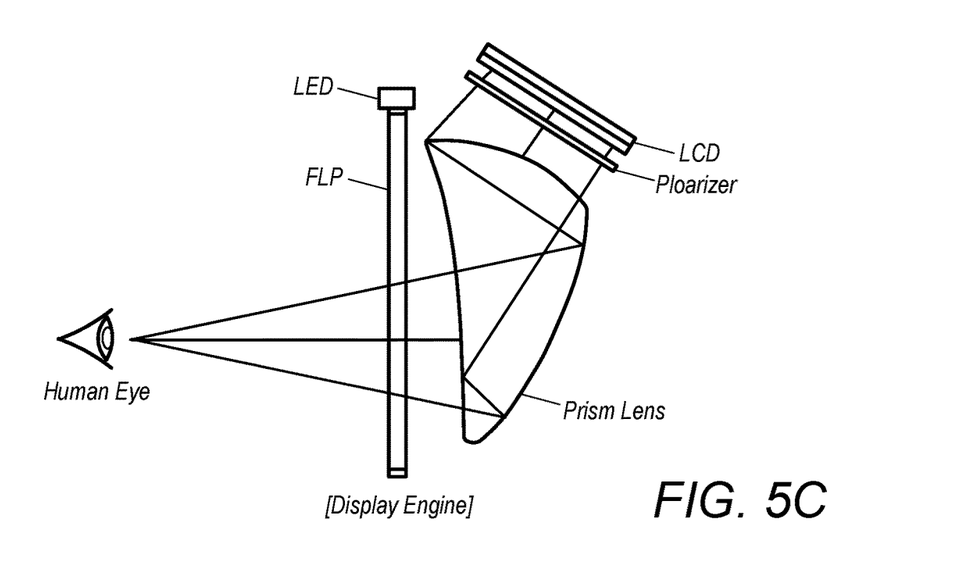

Aspherical optical arrangements include various types of prism and/or lens arrangements. FIGS. 5A-5C show some examples of aspherical optical arrangements that can be used in HMDs in accordance with various embodiments of the invention. FIG. 5A shows a coaxial arrangement of a set of lenses arranged along a common axis, and FIG. 5B shows a concave mirror arrangement. The basic function of these arrangements are to magnify the micro-display image and present them at a focal point that is comfortable for the typical eye vision. Human vision typically cannot focus closer than 10 inches. In HMD applications, the displays are placed in close proximity to the eyes and thus require these optical systems. Coaxial lens systems basically bend incoming light (image). A concave mirror arrangement does so similarly, but also folds the optical path to create virtual optical viewing distance (i.e., the viewing chart in an optometry office is projected through several mirrors to simulate 20 in length even though the office is much smaller). Coaxial optics are typically simple and lower cost. Unfortunately, there are concerns about their size proportional to image size required, spherical aberrations, bulky arrangement for HMD, and small eye motion box.

FIG. 5C shows a free shaped prism arrangement, in which the image from the display is redirected and magnified. This arrangement provides a large field of view and is compatible with a wide variety of display devices, although it may be somewhat more bulky than other optical arrangements described herein.

Figure 6A:
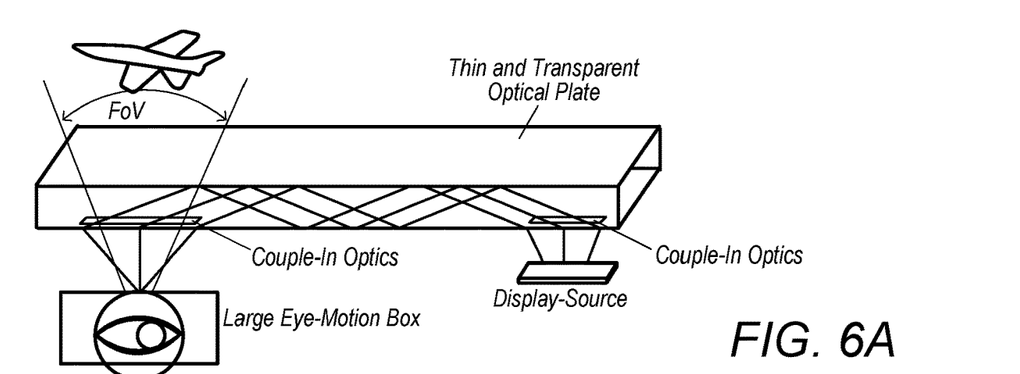
FIGS. 6A-6C show some schematic views of diffractive optical arrangements for use in a HMD in accordance with several embodiments of the invention.
Figure 6B:
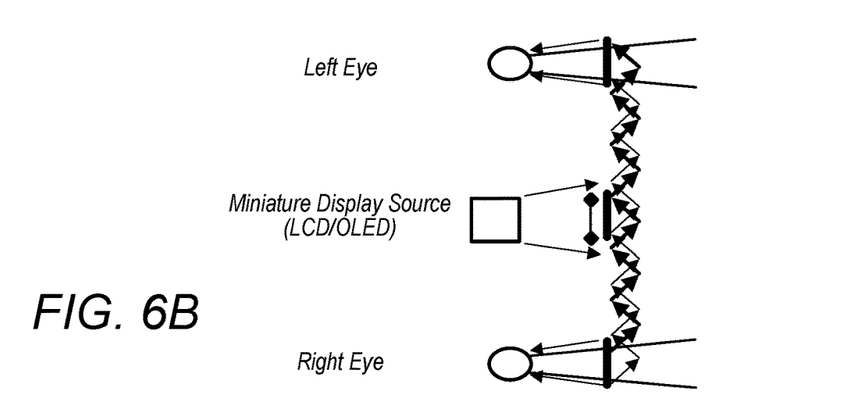
Figure 6C:
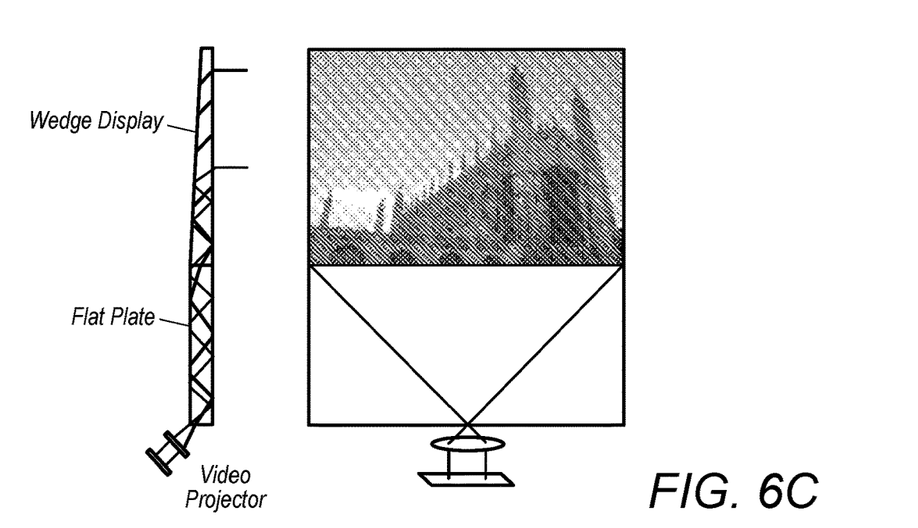

Diffractive optical arrangements include various types of arrangements that bend and spread light. FIGS. 6A-6C show some examples of diffractive optical arrangements that can be used in HMDs in accordance with various embodiments of the invention. FIG. 6A shows a light-guided optical element (LOE), which can be made of planar transparent glass or plastic. The LOE configuration increases the eye motion box for a given image and can be made as thin as about 2 mm. The LOE is see-through capable and provides a large field of view (up to about 40 degrees), and can also be encapsulated into a larger lens, if need be. The LOE can be used together with LCD and LCoS displays.

FIG. 6B shows a binocular light-guided optical element (BLOE), which can be made of planar transparent glass or plastic. In the BLOE configuration, a centered input image is directed to binocular images. Just like the LOE in FIG. 6A, the BLOE can be made thin, typically about 3 mm thickness, and is see-through capable. It can be used together with LCD and OLED displays. The advantage of BLOE over LOE is the alignment between the two images is inherent in the BLOE design. Left and right should be aligned with the eyes or it may cause physical distress to the user.

FIG. 6C shows a wedge display. The image enters the edge of the wedge optics, and travels through an expansion region before it is displayed to the user's eye. Its thickness can be as small as about 2 mm, and its size can be very large—up to 50-inch prototypes have been manufactured to date. It is also possible to use in a folded design, which may save space compared to other optical arrangements, and it accepts a wide variety of display types. This technology has been primarily focused on screen displays such as computer monitors and TVs, but can be used display screens in HMDs as well (the wedge display has not been used in a HMD application).

Figure 7:
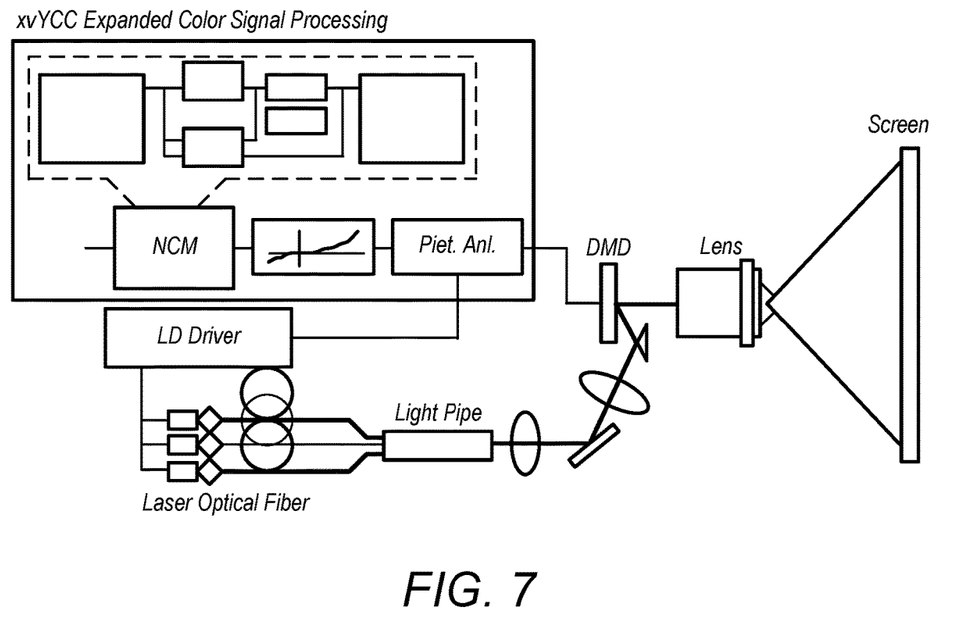
FIG. 7 shows a schematic view of a MEMs laser system for use in a HMD in accordance with several embodiments of the invention.

FIG. 7 shows a schematic view of a MEM/Laser System that can be used in HMDs in accordance with various embodiments of the invention. The Mem/Laser system uses red, green and blue lasers with a single or dual MEM device to generate raster-scanned images. At present, the horizontal scanning rate is about 31 kHz and the vertical scanning rate is in the range of about 0-400 Hz. Of course, these parameter will change as new types of MEM elements and lasers become available. One advantage of a MEMs laser system is they have an infinite focal distance. This means that one can create an image on a flat surface at any distance and that image will be in focus. Unfortunately, the brightness of the image may be limited (as the surface is farther away, the image dims).

The various embodiments described above have been focused on configurations using two displays. However, it is also possible to use a single display, surrounded by the peripheral light elements. Alternatively, optics can be provided that splits this single image and the light from the peripheral light elements into a right image and a left image to be displayed in front of each eye of the user at appropriate magnification.

In some embodiments, the display size is larger than the conventional HMD display size, and fills up a larger portion of the user's field of view, thus reducing the "box effect" or "tunnel effect" described above. The two displays may also be moved further apart in order to fill up a larger portion of the user's peripheral view, and a slightly different image may be shown on the displays to achieve a stereoscope-like effect. This configuration can further enhance the user's viewing experience, since the displays occupy a greater portion of the user's peripheral vision. Such a configuration is described in the co-pending U.S. patent application Ser. No. 11/580,580, filed Oct. 13, 2006 and entitled "Enhanced Image Display in Head Mounted Displays, which is hereby incorporated by reference in its entirety. The above described principles for peripheral treatment work equally well in these embodiments.

In some embodiments, the peripheral light elements (206; 208) are not located adjacent to the display itself, but rather somewhere along the light path between the displays (202; 204) and the user's eyes (212a; 212b). The exact location will depend on the specific optical arrangement of the HMD, but the operating principles and effects of the peripheral display elements are the same as if the peripheral light elements (206; 208) were located adjacent to the periphery of the displays (202; 204).

In some embodiments, the HMDs described above can also be equipped with an audio system, such as a set of headphones or some other type of audio device. This will allow the users to watch feature movies and/or documentaries essentially 30 anywhere and without having to worry about conventional issues, such as screen glare, and so on. Furthermore, the user experience in viewing movies using HMDs in accordance with various embodiments of the invention can be as good, or even better, than what a user experiences in a movie theatre.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be pmgrammed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

A number of implementations of the invention have been described. Nevertheless, it will be understood that various modifications may be made without departing from the spirit and scope of the invention. For example, the periphery displays can be used to create blurred images to coordinate with the main image. The periphery displays can also create non-active images similar to a frame which would enhance the main image in a different manner. The periphery displays can also create "anti-periphery" images or colors which technically enhance the image albeit not favorably. Accordingly, other embodiments are within the scope of the following claims.

The invention claimed is:

1. A head-mounted display apparatus, comprising:
  one or more displays configured to project an image to a user;
  one or more peripheral light elements configured to display one or more colors peripheral to a light path between the display and the user; and
  a processor configured to:
    receive data representing a source image;
    determine one or more periphery colors based at least in part on the data representing the source image;
    cause an image generated based on the source to be displayed on the one or more displays; and
    cause the one or more peripheral light elements to display the one or more colors peripheral to the light path between the display and the user.

2. The head-mounted display apparatus of claim 1, wherein respective ones of the one or more peripheral light elements are arranged on respective light paths between respective ones of the one or more displays and the user.

3. The head-mounted display apparatus of claim 1, wherein the one or more peripheral light elements are adjacent to the one or more displays.

4. The head-mounted display apparatus of claim 1, wherein the one or more peripheral light elements comprise optical fibers.

5. The head-mounted display apparatus of claim 1, wherein the one or more peripheral light elements comprise a diffuser configured to diffuse the light emitted by the one or more peripheral light elements.

6. The head-mounted display apparatus of claim 1, wherein the one or more peripheral light elements are adjacent to the one or more displays.

7. The head-mounted display apparatus of claim 1, wherein the one or more peripheral light element comprise a first of light emitting diodes (LEDs).

8. The head-mounted display apparatus of claim 1, wherein the one or more peripheral light elements comprise a plurality of electro luminescent displays (ELDs).

9. A method, comprising:
receiving, at a head-mounted display device, data representing a source image;
determining one or more periphery colors based at least in part on the data representing the source image;
displaying, on a display of the head-mounted display device, an image generated based on the source image; and
displaying, with a peripheral light element, the one or more periphery colors on a light path between the display and a user.

10. The method of claim 9, wherein determining the one or more periphery colors comprises:
dividing the source image into a central section and a plurality of periphery sections comprising a right periphery section, a left periphery section, a top periphery section, and a bottom periphery section; and
determining a respective predominating color in each of the plurality of periphery sections, wherein the one or more periphery colors for the image comprise the predominating colors.

11. The method of claim 9, wherein determining the one or more periphery colors comprises:
determining a predominating color in the source image, wherein the one or more periphery colors for the image comprise the predominating color.

12. The method of claim 9, further comprising:
dividing the source image into the image and a second image;
displaying, on a second display of the head-mounted display device, the second image.

13. The method of claim 12, further comprising:
determining one or more additional periphery colors based at least in part on the second image; and
displaying, with another peripheral light element, the one or more additional periphery colors on a second light path between the second display and the user.

14. The method of claim 9, wherein the data comprises a video including a plurality of video frames, and wherein the plurality of video frames comprises the source image.

15. One or more computer-readable storage media storing instructions that, when executed on or across one or more processors, cause the one or more processors to:
receive data representing a source image;
determine one or more periphery colors based at least in part on the data representing the source image;
sending, to a display device, an image generated based on the source image; and
instructing a peripheral light element to emit the one or more colors on a light path between the display and a user.

16. The one or more computer-readable storage media of claim 15, further comprising instructions that, when executed on or across the one or more processors, cause the one or more processors to:
divide the source image into a central section and a plurality of periphery sections comprising a right periphery section, a left periphery section, a top periphery section, and a bottom periphery section; and
determine a respective predominating color in each of the plurality of periphery sections, wherein the one or more periphery colors for the image comprise the predominating colors 17. The one or more computer-readable storage media of claim 15, further comprising instructions that, when executed on or across the one or more processors, cause the one or more processors to:
determine a predominating color in the source image, wherein the one or more periphery colors for the image comprise the predominating color.

18. The one or more computer-readable storage media of claim 15, further comprising instructions that, when executed on or across the one or more processors, cause the one or more processors to:
divide the source image into the image and a second image;
display, on a second display device, the second image.

19. The one or more computer-readable storage media of claim 18, further comprising instructions that, when executed on or across the one or more processors, cause the one or more processors to:
determine one or more additional periphery colors based at least in part on the second image; and
display , with another peripheral light element, the one or more additional periphery colors on a second light path between the second display and the user.

20. The one or more computer-readable storage media of claim 15, wherein the data comprises a video including a plurality of video frames, and wherein the plurality of video frames comprises the source image.

* * * * *